United States Patent [19]

Shaw et al.

[11] 3,819,470

[45] June 25, 1974

[54] MODIFIED CELLULOSIC FIBERS AND METHOD FOR PREPARATION THEREOF

[75] Inventors: David L. Shaw; Edward A. Wodka, both of Philadelphia, Pa.

[73] Assignee: Scott Paper Company, Philadelphia, Pa.

[22] Filed: June 18, 1971

[21] Appl. No.: 154,680

[52] U.S. Cl. .................. 162/157 C, 162/9, 162/25, 162/183
[51] Int. Cl. ............................................ B22c 17/08
[58] Field of Search .......... 162/183, 9, 100, 25, 20, 162/56, 164, 157 C; 8/116.3

[56] References Cited
UNITED STATES PATENTS

| | | | |
|---|---|---|---|
| 1,843,467 | 2/1932 | Traquair et al. | 162/25 |
| 2,343,095 | 2/1944 | Smith | 162/164 X |
| 2,488,515 | 11/1949 | Sherman et al. | 162/183 X |
| 2,516,384 | 7/1950 | Hill et al. | 162/100 X |
| 2,913,362 | 11/1959 | Cusi | 162/25 X |
| 2,992,154 | 7/1961 | Mauthner et al. | 162/9 |
| 3,023,140 | 2/1962 | Textor | 162/24 |
| 3,052,570 | 9/1962 | Polansky | 8/116.3 X |
| 3,067,088 | 12/1962 | Hofreiter et al. | 162/183 X |
| 3,093,609 | 6/1963 | Feigley et al. | 162/164 X |
| 3,149,023 | 9/1964 | Bodendorf | 162/183 X |
| 3,173,829 | 3/1965 | Thier et al. | 162/183 X |
| 3,236,721 | 2/1966 | Curtis | 162/183 X |
| 3,264,171 | 7/1966 | Gleason | 162/183 X |
| 3,300,372 | 1/1967 | Bauer | 162/183 X |
| 3,323,980 | 6/1967 | Poschmann | 162/183 X |
| 3,414,469 | 12/1968 | Brown et al. | 162/100 X |
| 3,420,735 | 1/1969 | Conte et al. | 162/183 X |
| 3,436,304 | 4/1969 | Spence | 162/164 X |
| 3,527,719 | 4/1970 | Hurwitz et al. | 260/88.7 B |
| 3,627,630 | 12/1971 | Gaghon | 162/100 |

OTHER PUBLICATIONS

Dictionary of Paper & Paper Making Terms; N. V. Swets & Zeitlinger, Amsterdam, 1937; pp. 139.

Primary Examiner—S. Leon Bashore
Assistant Examiner—Kenneth M. Schor
Attorney, Agent, or Firm—Nicholas J. DeBenedictis; John W. Kane

[57] ABSTRACT

Modified cellulosic fibers, characterized by improved properties, such as reduced swellability and reduced natural fiber-to-fiber bonding, are produced by a process which comprises treating an aqueous slurry of the fibers with a substantive polymeric compound, drying the treated fibers to cause the polymeric compound to react with itself and with the fibers, and refiberizing in water to separate the individual, treated fibers. The fibers are useful in the preparation of improved cellulosic sheet materials which exhibit increased bulk and reduced tensile strength.

22 Claims, No Drawings

MODIFIED CELLULOSIC FIBERS AND METHOD FOR PREPARATION THEREOF

BACKGROUND OF THE INVENTION

1. Field of the Invention

The present invention relates, generally, to modified cellulosic fibers, to a process for preparing said fibers, to improved cellulosic sheet materials containing said fibers and to a process for preparing said sheet materials. More particularly this invention relates to cellulosic fibers having improved properties, such as reduced swellability and reduced natural fiber-to-fiber bonding. The modified fibers are produced by treating an aqueous slurry of the fibers with a substantive polymeric compound, drying the treated fibers to cause the polymeric compound to react with itself and with the fibers, and refiberizing in water to separate the individual, treated fibers. Cellulosic sheet materials having improved properties, such as increased bulk and reduced tensile strength are prepared from a furnish comprising these treated fibers utilized either alone or in combination with normal, untreated paper-making fibers.

2. Description of the Prior Art

In a conventional paper-making operation cellulosic fibers are dispersed in water, drained on a wire screen, pressed into close physical contact and dried. The result is a sheet in which the individual fibers are intimately associated with one another through what is commonly referred to as hydrogen bonding or fiber-to-fiber bonding. It is generally believed that this hydrogen bonding between fibers is what gives strength to the dry sheet. When the dry sheet is wet, this intimate association between fibers is reduced, and the sheet loses most of its strength. To prevent this strength loss, various chemical treatments have been employed. Among the most successful treatments is the use of synthetic resins which, when added to the cellulosic fibers, either before or after a sheet is formed therefrom, and cured or polymerized, can significantly increase the wet strength of the sheet. Most commonly used are the urea-formaldehyde and melamine-formaldehyde type resins. These resins are referred to as being substantive with respect to cellulosic fibers, because they are cationic and are, therefore, easily deposited on and retained by the anionic paper-making fibers.

It is also well-known that, in the normal paper-making operation, the cellulosic fibers when dispersed in water absorb water and thereby swell. When formed into a sheet, pressed and dried the water is removed and the fibers revert to their natural state. The result is a sheet in which the fibers are very compact, or close together, resulting in a relatively stiff sheet.

Prior attempts have been made to produce sheets having improved bulk, or thickness, without significantly increasing the weight or cost of the product or adversely affecting the other properties thereof. These attempts have included the reduction or elimination of wet pressing which, although it results in some increase in bulk, requires modified equipment and cannot be run on conventional paper-making equipment. Also, because of the higher water content of sheets which are not pressed, this method requires more extensive drying. Other methods, such as the addition of more fibers to the sheet, increase both the weight and cost of the product to a point sufficient to offset any increase in bulk. Non-fibrous chemical additives, such as the gas filled spheres of thermoplastic resins described in U.S. Pat. No. 3,556,934, have also been suggested but these often interfere with normal paper-making operations and adversely affect some of the other properties (e.g., absorbency, etc.) of the product. One method of overcoming many of these disadvantages is disclosed in our patent application entitled "Method of Utilizing Waste Papers Containing Wet-Strength Resins" filed concurrently herewith. While the process disclosed therein has proven to be useful in the preparation of products having increased bulk, the improvements obtained by way of this alternative process are limited by the amount of resin normally employed in wet-strength products and by the supply of waste papers available. In addition, waste papers often contain additional additives, such as dyes, which must be removed before the paper is reused.

The use of cross-linked cellulosic fibers is also well known in the paper-making field. See, for example, U.S. Pat. No. 3,069,311 (Harpham et al), U.S. Pat. No. 2,010,635 (Kantorowicz), U.S. Pat. No. 3,224,926 (Bernardin), U.S. Pat. No. 3,434,918 (Bernardin), U.S. Pat. No. 3,440,135 (Chung) and U.S. Pat. No. 3,455,778 (Bernardin). All of the above-mentioned patents obtain the cross-linked fibers by impregnating the cellulosic fibers with a monomeric cross-linking agent followed by heating to cause a cross-linking reaction to take place. Several inherent disadvantages have prevented the wide scale commercial use of any of these previously available cross-linked fibers. These disadvantages include the following: (1) many of the monomers used to obtain these fibers are unstable and difficult to work with; (2) impregnation of the fibers often requires storage of the wet pulp for periods of time up to four days; (3) because the reaction between the cross-linking agent and the cellulose is limited, a significant period of time at elevated temperatures is required to effect complete cross-linking. (Since the cellulosic fibers are heat-sentitive and will char or burn if the fiber temperature becomes too high, extended periods of time at lower temperatures are often required to achieve complete cross-linking); and (4) the resultant cross-linked fibers are stiffened to such an extent that subsequent refining in a conventional paper-making process would cause destruction of the fibers by reducing them to a powder.

SUMMARY OF THE INVENTION

In accordance with the present invention, modified cellulosic fibers, characterized by improved properties such as reduced swellability and reduced natural fiber-to-fiber bonding, are produced by a process which comprises treating an aqueous slurry of the fibers with a substantive polymeric compound, drying the treated fibers to cause the polymeric compound to react with itself and with the fibers, and refiberizing in water to separate individual treated fibers. Cellulosic sheet materials having improved properties, such as increased bulk and reduced tensile strength, are prepared from a furnish comprising these treated fibers utilized either alone or in combination with normal, untreated paper-making fibers.

DESCRIPTION OF THE PREFERRED EMBODIMENTS

In accordance with the present invention, modified cellulosic fibers are prepared by a three-step process.

In the first step, an aqueous slurry of cellulosic fibers is treated with a substantive polymeric compound. In the second step, the treated fibers are dried to cause the polymeric compound to react with the fibers and with itself. The third, and final step, is refiberizing in water to separate the individual treated fibers. Each step is discussed in detail below.

1. Chemical Treatment

It has been found that any cellulosic fiber normally employed in paper-making operations can be modified by treatment in accordance with the present invention. These include dried of never-dried groundwood, chemical, or semi-chemical pulps and secondary fibers. The pulps are preferably treated as an aqueous slurry.

After the pulp slurry is formed there is added a substantive polymeric compound such as a water-soluble, thermosetting, cationic resin well-known in the art for increasing the wet strength of cellulosic sheet materials and including, for example, urea-formaldehyde, melamine-formaldehyde, polyureide-formaldehyde glyoxal-acrylamide, and polyamide-epichlorohydrin resins. The amount of polymeric compound added can be varied over a wide range depending upon the type of pulp employed, properties desired in the modified fiber, other chemicals added, drying and refiberizing conditions employed, etc. It has been found that the most satisfactory results are achieved when the polymeric compound is added in an amount equal to from about 0.5 percent to about 6.0 percent of the bone dry weight of the fibers, and it is especially preferred to add this amount of the polymeric compound. It has been found that, when the above amounts of the polymeric compound are added to the pulp slurry, from about 0.5 percent to about 3.5 percent of the polymer, based on the bone dry weight of the fibers, is retained by the fibers. The amount of resin retained by the fibers can be determined utilizing the Kjeldahl method for nitrogen analysis.

It is also preferred, when working with certain polymers such as urea-formaldehyde and melamine-formaldehyde, to add a mineral acid, such as sulfuric acid, with the polymeric compound. It is especially preferred to add the acid in an amount sufficient to adjust the pH of the aqueous fiber slurry to from about 3.0 to about 5.5. Without wishing to be bound by any particular theory, but to aid in explaining the present invention, it is believed that the acid acts as a catalyst to accelerate the reaction of the polymeric compound during the drying step.

To assist in the production of individual modified fibers with a minimum expenditure of energy during the refiberizing step, it is also preferred to add a surface-active agent as part of the chemical treatment. These compounds, which are known in the paper-making art to interfere with natural fiber-to-fiber bonding, may be added to the pulp slurry before, after, or simultaneously with the addition of the polymeric compound. Cationic surface-active agents have been found to be especially useful. These include compounds such as Quaker 2000 and Velvetol CHR, which are high molecular weight quaternized imidazolines available from Quaker Chemical Corporation, Conshohocken, Pa.; dialkylamide diethyl ammonium sulfate, available from Ryco. Inc., Conshohocken, Pa. as Rycofax 618; dihydrogenated tallow dimethyl ammonium chloride, available from General Mills Inc., Chemical Division, Kankakee, Illinois as Aliquat H226; dimethyl dialkyl ammonium chloride, available from Ashland Oil and Refining Co., New York, New York as Adogen 432; dimethyl dialkyl tallow ammonium chloride, also available from Ashland Oil & Refining Company as Adogen 442; Arquad 2HT75, which is a dialkyl dimethyl ammonium chloride available from Armour Industrial Chemical Company, Chicago, Illinois; Cellolube QN, which is a quaternary ammonium paper softener, available from The Tanatex Chemical Corp., Lyndhurst, New Jersey; and Avitex ML, which is a quaternary alkylolamine available from E. I. duPont de Nemours & Co., Inc., Wilmington, Delaware. Although the amount of surface active agent added has not been found to be narrowly critical to the operability of the present invention, it is especially preferred to add these compounds in an amount equal to from about 0.1 percent to about 2.0 percent of the bone-dry weight of the fibers.

After the chemicals have been added the slurry is agitated, dewatered, and concentrated by pressing or centrifugal extraction. It is especially preferred to remove water until the fibers are at a consistency of approximately 40 percent solids.

2. Drying

The chemically treated fibers are dried to remove water and thereby cause the polymeric compound to react with itself and with the fibers. Those processes normally employed for fluff-drying and lap-drying of wood pulp, and which are well known in the art, can be employed.

The drying may be carried out either at room temperature over an extended period of time or at elevated temperatures. If heat is used, it is especially preferred to heat the fibers to a temperature of from about 60° C to about 250° C for a period of time of from about 1.5 minutes to about 120 minutes.

The exact drying conditions employed can be varied, depending primarily upon a variety of factors, such as the pulp employed, the amount and type of chemicals added, the properties desired in the final modified pulp, etc.

3. Refiberizing

The treated, dried fibers are reslurried in water; and the individual fibers are then separated by treatment with high-shear mechanical equipment. Illustrative of such equipment is a Waring Blender or Cowles Dissolver for small-scale laboratory or pilot plant size operations and, for large scale production, a combination of a high shear pulper, such as the Bolton-Emerson Tornado or the Beloit-Jones Barracuda, for initial slurrying, followed by treatment in a high shear deflaker such as the Bolton-Emerson Deflaker or the Beloit-Jones Dispersal.

The Bolton-Emerson Tornado and Deflaker are available from Bolton-Emerson, Inc., Lawrence, Massachusetts and the Beloit-Jones Barracuda and Dispersal from Beloit Corp., Jones Division, Pittsfield, Massachusetts.

To assure that the polymeric compound which is reacted with the fibers remains attached to the fibers, the refiberizing step is conducted at an approximately neutral pH. Satisfactory results have been achieved when the pH is from about 5.0 to about 8.0. It is also preferred to carry out the refiberization at environmental temperature, i.e., without the external application of heat. Although some heat is generated during the mechanical treatment of the fibers, this has not been found to be detrimental to the production of modified fibers in accordance with the present process. Accordingly, it has not been found to be necessary to employ an external cooling source. It is also preferred to screen the pulp after the refiberizing step to separate the individual modified fibers from any residual fiber bundles. Employing the above-mentioned refiberizing procedure, it has been possible to separate approximately 90 percent of the treated, dried pulp as individual fibers, with essentially no removal of the polymeric compound from the fibers.

Fibers produced by the above process are useful in the preparation of sheet materials characterized by their improved bulk and softness as well as their reduced tensile strength and improved caliper, cushion, nap, drape, absorbency and opacity. When preparing sheets, modified fibers prepared in accordance with the present invention can be employed alone or in combination with normal, untreated, cellulosic, paper-making fibers. It is especially preferred to employ the modified fibers in an amount equal to from about 25 percent to about 75 percent of the bone-dry weight of the total fibers employed. As indicated above, the modified fibers produced in accordance with this invention are not destroyed or reduced to a powder by refining in a conventional paper-making process.

When sheets are prepared from a furnish comprising the modified fibers of this invention, it has been found to be especially useful to also employ a resinous binder, such as an acrylic emulsion or a styrene-butadiene latex. Commercially available resins which have been found to be particularly useful include Rhoplex K3, a nonionic self-crosslinking acrylic emulsion available from Rohm and Haas Company, Philadelphia, Pennsylvania; Rhoplex P339, an anionic self-crosslinking acrylic emulsion, also available from Rohm and Haas Company; Goodrite 2570 X 15, an anionic, carboxylated styrene-butadiene copolymer containing in excess of 70 percent butadiene available from B. F. Goodrich Chemical Company, Cleveland, Ohio; and Tylac RB 1118, an anionic, carboxylated styrene-butadiene copolymer containing approximately 50 percent styrene, available from Standard Brands Chemical Corporation, Dover, Delaware. The following anionic, self-crosslinking, acrylic emulsions available from Rohm and Haas Company have also been found to be particularly useful — Rhoplex E631, Rhoplex E610, and Rhoplex TR407. Other useful, commercially available resins include Pliolite 610, a styrene-butadiene latex from B. F. Goodrich Chemical Company, and Rhoplex E32, a nonionic, self-crosslinking acrylic emulsion from Rohm and Haas Company. Another resin, which has been found to be useful in carrying out the present invention, is a cationically dispersed acrylic emulsion comprising about 68 parts ethyl-acrylate and about 32 parts styrene.

The amount of resinous binder employed can be varied over a wide range depending upon the properties desired in the final product, the nature of the furnish, the amount of resin retained on the fibers, and other variables associated with the sheet-forming operation. It is especially preferred to employ an amount of resinous binder equal to from about 3.0 percent to about 15.0 percent of the oven dry weight of the fibers employed.

When a resinous binder is employed, it is preferred to add to the furnish an additional component, referred to as a deposition aid, which will cause the resin to be deposited on and adhere to the fibers. Compounds which have been found to be especially useful for this purpose include those compounds which are known to be useful for depositing a water-insoluble polymer onto cellulosic fibers. These compounds include, for example, vinyl imidazoline polymers, such as those disclosed in U.S. Pat. No. 3,527,719 and in British Pat. No. 1,052,112, and polyquaternary ammonium compounds, such as those described in U.S. Pat. No. 2,765,229. Commercially-available compounds which have been found to be particularly useful include Lufax 295, a cationic polyelectrolyte available from Rohm and Haas Company, Philadelphia, Pennsylvania; and Resin S243, a cationic solution polymer also available from Rohm and Haas.

The amount of deposition aid employed can be varied over a wide range depending on the type of furnish employed, the amount of resinous binder to be deposited, and other variables associated with the sheet-forming operation. It is especially preferred to employ an amount equal to from about 0.1 percent to about 3.0 percent, of the weight of the resinous binder employed.

In order to describe the present invention so that it may be more clearly understood, the following examples are set forth. These examples are set forth primarily for the purpose of illustration, and any enumeration of detail contained therein should not be interpreted as a limitation on the concept of this invention.

The test results reported in the examples were determined by the following standard procedures:

Freeness was measured in accordance with TAPPI Standard No. T227M–58.

Swellability was determined by the method described in TAPPI Vol. 48, No. 9, pages 494–496 (1965) in an article by P. N. Yiannos entitled "Swellability of Pulps Determined by Isopropanol Retention." When dried pulps were employed, the pulp was dispersed, at a consistency of 0.4 percent, for one minute in a Waring Blender instead of being soaked in water overnight.

Basis weight of handsheets was measured in accordance with TAPPI Standard No. T410–05–61.

Caliper, or the thickness of one sheet, was measured with a Federal Micrometer, Gauge Model No. D81S in accordance with TAPPI Standard No. T411M–44. A one square inch face area (pressure of 0.5 psi) was employed when testing 28 pounds per ream sheets instead of the standard 0.25 inch face area (pressure of 7 to 9 psi).

Tensile strength was measured in accordance with TAPPI Standard No. T404–T5–66.

Bulk, or the thickness of 24 sheets, was measured with a Federal Micrometer Gauge, Model No. D81S employing a one square inch face area (pressure of 0.5 psi).

EXAMPLE I

Sixty grams of unbeaten bleached, southern pine, kraft, slush pulp were suspended in 2 liters of water at room temperature in a British disintegrator. The pH of the suspension was adjusted to 4.0 with concentrated sulfuric acid. 13.2 grams of an aqueous solution containing 27.3 percent by weight cationic urea formaldehyde resin were added and the pH was again adjusted to 4.0 with concentrated sulfuric acid. The amount of solid urea formaldehyde resin added was equal to 6.0 percent of the bone-dry weight of the pulp. The slurry was filtered through a Buchner funnel to approximately 30 percent dryness, mechanically fluffed, and dried by heating in an air convection oven for 45 minutes at 250° F. Analysis of the modified pulp, by the Kjeldahl method for nitrogen content, indicated that about 3.0 percent, based on the bone-dry weight of the fibers, of urea formaldehyde resin was retained by the fibers.

The modified pulp was refiberized in 2 gram batches in 500 ml of water in a Waring Blender, Model No. 1002, at the high speed setting for one minute. The result was a uniformly dispersed, flake-free pulp slurry.

A sample of the modified pulp was evaluated and had the following properties:

| | |
|---|---|
| Freeness | 790 cc |
| Swellability | 47 cc/100g |

By comparison a sample of the unmodified pulp had a Freeness of 700 cc and a Swellability of 94 cc/100g.

Handsheets were prepared on a standard Noble and Wood Handsheet Apparatus using 100 mesh screens and a furnish comprising 100 percent modified pulp. All handsheets had a basis weight of 28 pounds per ream (2,880 square feet). Evaluation of the handsheets gave the following results:

| | |
|---|---|
| Caliper | 17 mils |
| Tensile | less than 2 oz/in. |

By comparison handsheets prepared from the unmodified pulp had a caliper of 7 mils and a Tensile of 77 oz/in.

EXAMPLE II

Several different wood pulp samples were modified by the procedure described in Example I. The results of tests run on the modified pulps and on 28 pound per ream handsheets prepared, as in Example I, from a furnish comprising 100 percent modified pulp are reported in the following table. An untreated sample of each pulp was also tested as a control.

The pulps evaluated were
A. Bleached, Southern hardwood, Kraft
B. Bleached, Southern pine, Kraft
C. Bleached, Northern spruce, Kraft
D. Bleached, Western spruce, sulfite
E. Unbleached, Southern pine, Kraft
F. Groundwood

EXAMPLE III

Bleached, southern pine, Kraft pulp samples were treated with different water soluble, cationic, thermosetting resins as in Example I. The results of tests run on the modified pulps and on 28 pound per ream handsheets prepared, as in Example I, from a furnish comprising 100 percent modified pulp, are reported in the following table. The percentage of each resin was the amount added to the pulp slurry based on the bone-dry weight of the fibers.

The resins evaluated were
A. An aqueous solution containing 27.3 percent by weight cationic, urea-formaldehyde resin prepared by the procedure described in U.S. Pat. No. 3,275,605 issued to Eastes et al.
B. An aqueous solution of a cationic, urea-formaldehyde resin also prepared by the procedure described in U.S. Pat. No. 3,275,605. This resin had a higher molecular weight than the resin designated as A, above.
C. An aqueous solution of a cationic, melamine-formaldehyde resin.
D. An aqueous solution of a glyoxal-acrylamide resin available from American Cyanamid Company, Stamford, Connecticut as 630 NC.

| RESIN | % | FREENESS (cc) | TENSILE (oz/in) | CALIPER (.001 in) |
|---|---|---|---|---|
| None | — | 750 | 59 | 7.3 |
| A | 6 | 774 | less than 2 | 10.0 |
| B | 6 | — | less than 2 | 11.0 |
| C | 5 | 790 | less than 2 | 13.9 |
| D | 5 | 779 | 32 | 7.6 |

EXAMPLE IV

Several samples of never-dried, bleached, southern pine, kraft, slush pulp were treated with varying amounts of an aqueous solution containing 27.3 percent by weight cationic urea formaldehyde resin, dried and refiberized as in Example I. The results of tests run on the modified pulps and on 28 pound per ream handsheets prepared, as in Example I, from a furnish comprising 100 percent modified pulp are reported in the following table. The percentage of resin was the amount of solid resin added to the pulp slurry, based on the bone-dry weight of the pulp fibers.

| PULP | FREENESS (cc) | SWELLABILITY (cc/100g) | CALIPER (oz/in) | TENSILE (.001 in) |
|---|---|---|---|---|
| A modified | — | — | 2 | 10.0 |
| A control | — | — | 45 | 7.0 |
| B modified | 777 | 47 | less than 2 | 10.0 |
| B control | 750 | 94 | 59 | 7.3 |
| C modified | 732 | 53 | less than 2 | 9.5 |
| C control | 657 | 90 | 60 | 6.3 |
| D modified | 764 | 50 | less than 2 | 12.1 |
| D control | 627 | 95 | 88 | 6.4 |
| E Modified | — | — | less than 2 | 17.4 |
| E control | — | — | 91 | 7.8 |
| F modified | 700 | — | 7.0 | 11.0 |
| F control | 193 | — | 51.8 | 9.2 |

| % RESIN ADDED | FREENESS (cc) | SWELLABILITY (cc/100g) | TENSILE (oz/in) | CALIPER (.001 in) |
|---|---|---|---|---|
| 0 | 740 | 94 | 77 | 6.5 |
| 0.5 | — | 95 | 22 | 8.0 |
| 1.0 | — | — | 10 | 9.7 |
| 1.5 | — | 65 | 4 | 11.0 |
| 2.0 | — | 64 | less than 2 | 13.4 |
| 2.5 | — | — | less than 2 | 14.5 |
| 3.0 | — | 52 | less than 2 | 15.8 |
| 5.0 | — | — | less than 2 | 16.6 |
| 6.0 | 790 | 53 | less than 2 | 17.3 |

| PULP SAMPLE | FREENESS (cc) | SWELLABILITY (cc/100g) | CALIPER (oz/in) | TENSILE (.001 in) |
|---|---|---|---|---|
| A | 774 | 47 | less than 2 | 12.5 |
| B | 774 | 44 | less than 2 | 15.2 |
| C | 777 | 47 | less than 2 | 18.7 |
| D | 762 | 50 | less than 2 | 13.9 |
| Control | 750 | 94 | 59 | 7.3 |

EXAMPLE V

Four samples of bleached, southern pine, Kraft pulp were treated with chemicals, dried and refiberized as in Example I. The chemical treatments were as follows:

Sample A — To the pulp slurry was added 6.0 percent, based on the bone dry weight of the pulp, of urea-formaldehyde resin. The resin was added as an aqueous solution containing 27.3 percent by weight of the resin.

Sample B — To the pulp slurry was added 6.0 percent, based on the bone dry weight of the pulp, of urea-formaldehyde resin. The resin was added as an aqueous solution containing 27.3 percent by weight of the resin. After the resin addition was completed an aqueous solution containing 1.5 percent, also based on the bone dry weight of the pulp, of Quaker 2000, a high molecular weight quaternized imidazoline available from Quaker Chemical Corp., Conshohocken, Pa., was added.

Sample C — To the pulp slurry was added an aqueous solution containing 1.5 percent, based on the bone dry weight of the pulp, of Quaker 2000, a high molecular weight quaternized imidazoline available from Quaker Chemical Corp., Conshohocken, Pa. After the Quaker 2000 addition was completed, 6.0 percent, also based on the bone dry weight of the pulp, of solid urea formaldehyde resin was added. The resin was added as an aqueous solution containing 27.3 percent by weight of the resin.

Sample D — To the pulp slurry there was added, simultaneously, an aqueous solution containing 1.5 percent based on the bone dry weight of the pulp of Quaker 2000, a high molecular weight, quaternized imidazoline available from Quaker Chemical Corp., Conshohocken, Pa. and an aqueous solution containing 27.3 percent by weight of cationic, urea-formaldehyde resin. The total amount of resin added was equal to 6.0 percent of the bone dry weight of the pulp.

The results of tests run on the modified pulps and on 28 pound per ream handsheets prepared, as in Example I, from a furnish comprising 100 percent modified pulp are reported in the following table. The results were compared to a control handsheet containing 100 percent unmodified pulp.

EXAMPLE VI 20 grams of bleached, southern pine, Kraft slush pulp were suspended in 2 liters of water at room temperature in a British disintegrator. The pH of the suspension was adjusted to 4.0 with concentrated sulfuric acid. 4.3 grams of an aqueous solution containing 27.3 percent by weight cationic urea formaldehyde resin were added. The amount of urea formaldehyde resin added was equal to 6.0 percent of the bone dry weight of the pulp. 0.31 grams of an aqueous solution containing 95 percent by weight Quaker 2000, a high molecular weight quaternized imidazoline available from Quaker Chemical Corp., Conshohocken, Pa. was then added. The amount of solid Quaker 2000 added was equal to 1.5 percent of the bone dry weight of the pulp. The pH of the pulp suspension was again adjusted to 4.0 with concentrated sulfuric acid. The slurry was filtered through a Buchner funnel to approximately 30 percent dryness, mechanically fluffed, and allowed to dry to approximately 90–95 percent dryness with moderate heating on a hot plate followed by heating in an air convection oven for 5 minutes at 250° F. Drying was completed by placing the pulp in an air convection oven, first for one minute at 550° F and then for one minute at 510° F.

The modified pulp was refiberized in 2 gram batches in 500 ml of water in a Waring Blender, Model No. 1002, at the high speed setting for 1 minute. The result was a uniformly dispersed, flake-free, pulp slurry.

Handsheets having a basis weight of 28 pounds per ream were prepared from a furnish comprising 100 percent modified pulp. Evaluation of the handsheets gave the following results:

| Caliper | 11.0 mils |
|---|---|
| Tensile | 6.2 oz/in |

By comparison handsheets prepared from the unmodified pulp had a caliper of 6.9 mils and a tensile of 69 oz/in.

EXAMPLE VII

Three pulp samples were treated by the following procedure. 20.2 pounds of the pulp was suspended in 172.5 liters of water in a Cowles dissolver Model No. 7VTV. To the stirring pulp suspension there was added 2,200 grams of an aqueous solution containing 25 percent by weight of cationic, thermosetting, urea formaldehyde resin. The resin added was equal to about 6.0 percent of the bone dry weight of the pulp fibers. There was also added to the pulp suspension 145 grams of an aqueous solution containing 95 percent by weight of Quaker 2000, a high molecular weight quaternized imidazoline available from Quaker Chemical Corp., Conshohocken, Pa. The solid Quaker 2000 added was equal to approximately 1.5 percent of the bone dry weight of the pulp fibers.

After being agitated for 20 minutes the mixture was filtered through a screen box, placed in pillow cases and centrifuged to approximately 45 percent solids. The resulting pulp was fluffed by passing through a spike tooth refiner, placed in mesh bags and heated in a tumble oven at 250° F for 1 hour.

The modified pulp was refiberized by treating 7.5 pounds of pulp in 167.2 liters of water in a Cowles dissolver Model No. 7VTV. The freeness of the modified pulp was determined and handsheets were prepared from the pulp as in Example I.

The pulp properties and handsheet properties of the pulps modified by this procedure are given in the following table:

| PULP | PULP PROPERTIES | | HANDSHEET PROPERTIES | |
|---|---|---|---|---|
| | FREENESS (cc) | SWELLABILITY (cc/100g) | CALIPER (oz/in) | TENSILE (.001 in) |
| Bleached, Southern pine, Kraft | 780 | 47 | less than 2 | 16 |
| Bleached, Northern spruce, Kraft | 757 | — | less than 2 | 13 |
| Bleached, Southern hardwood, Kraft | 769 | — | less than 2 | 11 |

EXAMPLE VIII 20 grams of bleached, southern pine, Kraft slush pulp were suspended in water and treated with urea formaldehyde resin and Quaker 2000 as in Example VI.

The resulting pulp slurry was formed into a sheet, or lap, having a basis weight of 300 pounds per ream and a dryness of from about 90–95 percent, on a Noble and Wood handsheet apparatus using 100 mesh screens. Drying of the resulting pulp lap was completed in an air convection oven at 250° F for 10 minutes.

The dried pulp lap was refiberized in 2 gram batches in 500 ml of water in a Waring Blender, Model No. 1002, at the high speed setting for one minute. The result was a uniformly dispersed, flake-free, pulp slurry.

The modified pulp, when tested by the Kjeldahl method for nitrogen analysis, retained 2.9 percent, based on the bone dry weight of the pulp fibers, of urea formaldehyde resin. A sample of the modified pulp had the following properties:

| Freeness | 760 cc |
|---|---|
| Swellability | 40.5 cc/100g |

By comparison a sample of the unmodified pulp had a Freeness of 702 cc and a Swellability of 95.3 cc/100g.

Handsheets having a basis weight of 28 pounds per ream were prepared from a furnish comprising 100 percent modified pulp. Evaluation of the handsheets gave the following results:

| Caliper | 15 mils |
|---|---|
| Tensile | less than 2 oz/in |

By comparison handsheets prepared from the unmodified pulp had a caliper of 7.0 mils and a tensile of 45 oz/in.

EXAMPLE IX

Bleached, southern pine, Kraft, slush pulp was slurried in water and treated with 6 percent, based on the bone dry weight of the fibers, of cationic urea formaldehyde resin and 1.25 percent, also based on the bone dry weight of the fibers, of Quaker 2000, a high molecular weight quaternized imidazoline available from Quaker Chemical Corp., Conshohocken, Pa. The urea formaldehyde resin was added as an aqueous solution containing 25 percent by weight of resin. The Quaker 2000 was added as an aqueous solution containing 95% by weight of the Quaker 2000. The chemically treated pulp was filtered, pressed, heated to cure, and refiberized as in Example VII.

Handsheets were prepared as in Example I from several furnishes comprising 100 percent modified fibers and combinations of the modified fibers and untreated bleached, southern pine, Kraft, slush pulp. The results of tests run on these handsheets are given in the following table:

| FURNISH | | TENSILE | CALIPER |
|---|---|---|---|
| % Modified Fibers | % Unmodified | (oz/in) | (.001 in) |
| 0 | 100 | 62 | 6.9 |
| 25 | 75 | 22 | 9.0 |
| 50 | 50 | 9 | 12.0 |
| 75 | 25 | 4 | 15.5 |
| 100 | 0 | less than 2 | 21.0 |

EXAMPLE X

An aqueous slurry of bleached, sourtern pine, Kraft pulp at 1 percent consistency was treated with a urea formaldehyde resin in an amount equal to 6.0 percent of the bone dry weight of the fibers and Quaker 2000 in an amount equal to 1.25 percent of the bone dry weight of the fibers. The pH of the slurry was maintained at between 4.0 and 4.5 by the addition of concentrated sulfuric acid.

The treated pulp was dried to a consistency of 80–85 percent and stored for several months. The treated dried pulp was refiberized in water at 2 percent consistency in a Cowles Dissolver Model No. 7VTV with a high shear agitator revolving at 2,000 rpm for 90 minutes.

A paper-making furnish was prepared comprising 65 percent of the modified fibers prepared as above, 25 percent of a bleached, northern spruce, Kraft, dry lap pulp and 10 percent of a bleached, southern hardwood, Kraft dry lap pulp, 15 percent, based on the bone dry weight of the fibers, of E610 an acrylic latex available from Rohm and Haas Company, Philadelphia, Pa., and 2 percent, based on the weight of the latex, of S243 a deposition aid, also available from Rohm and Haas Company.

The above furnish was used to prepare 28 pound per ream sheets on a conventional paper-making machine. A sample of the sheets was evaluated after drying but before creping and had the following properties:

| | |
|---|---|
| Bulk (mils) | 160 |
| Machine Direction Tensile (oz/in) | 61 |
| Cross Direction Tensile (oz/in) | 30 |

A control sample prepared from a furnish comprising 65 percent bleached, southern pine, Kraft, dry lap pulp, 25 percent bleached, northern spruce, Kraft, dry lap pulp, and 10 percent bleached, southern hardwood, Kraft, dry lap pulp had the following properties:

| | |
|---|---|
| Bulk (mils) | 120 |
| Machine direction Tensile (oz/in) | 139 |
| Cross Direction Tensile (oz/in) | 50 |

Creped sheets prepared from the above furnish containing modified fibers had the following properties:

| | |
|---|---|
| Bulk (mils) | 243 |
| Machine Direction Tensile (oz/in) | 39 |
| Cross Direction Tensile (oz/in) | 21 |

By comparison, the creped control had the following properties:

| | |
|---|---|
| Bulk (mils) | 177 |
| Machine Direction Tensile (oz/in) | 56 |
| Cross Direction Tensile (oz/in) | 23 |

What is claimed is:

1. A method of preparing modified cellulosic fibers which comprises;
    treating an aqueous slurry of the fibers with a substantive polymeric compound,
    dewatering and drying the treated fibers to cause the polymeric compound to react with itself and with the fibers, and
    refiberizing the treated, dried fibers in water with essentially no removal of the polymeric compound from the fibers to separate individual fibers.

2. A method, as claimed in claim 1, in which the cellulosic fibers are wood pulp fibers.

3. A method, as claimed in claim 1, in which the polymeric compound is a water-soluble, thermosetting cationic resin.

4. A method, as claimed in claim 3, in which the polymeric compound is a urea-formaldehyde resin.

5. A method, as claimed in claim 1, in which the polymeric compound is added to the fiber slurry in an amount equal to from about 0.5 percent to about 6.0 percent of the bone dry weight of the fibers.

6. A method, as claimed in claim 1, in which the amount of the polymeric compound retained by the fibers is equal to from about 0.5 percent to about 3.5 percent of the bone dry weight of the fibers.

7. A method, as claimed in claim 1, in which the pH of the fiber slurry is maintained at from about 3.0 to about 5.5 during the addition of the polymeric compound.

8. A method, as claimed in claim 7, in which the pH is maintained by the addition of a mineral acid.

9. A method, as claimed in claim 2, in which a surface active agent is added to the aqueous fiber slurry in an amount equal to from about 0.1 percent to about 2.0 percent of the bone dry weight of the fibers.

10. A method, as claimed in claim 1, in which the consistency of the fibers prior to drying is about 40 percent.

11. A method, as claimed in claim 1, in which the treated, dried fibers are refiberized with high shear mechanical equipment.

12. A method, as claimed in claim 1, in which the treated, dried fibers are refiberized at a pH of from about 5.0 to about 8.0.

13. A method, as claimed in claim 1, in which the treated, dried fibers are refiberized at environmental temperature.

14. A method, as claimed in claim 1, in which the refiberizing separates at least 90 percent of the treated, dried pulp as individual fibers.

15. Modified cellulosic fibers characterized by reduced swellability and a reduced capability of natural fiber-to-fiber bonding when compared to unmodified cellulosic fibers and having a substantive polymeric compound reacted with and attached to the fibers.

16. A cellulosic sheet material prepared from a furnish comprising 100 percent modified cellulosic fibers of claim 15.

17. A cellulosic sheet material prepared from a furnish comprising the modified cellulosic fibers of claim 15 and unmodified cellulosic fibers.

18. A cellulosic sheet material, as claimed in claim 17, in which the amount of modified fibers in the furnish is equal to from about 25 percent to about 75 percent of the total bone dry weight of the fibers.

19. A cellulosic sheet material as claimed in claim 17, in which there is added to the furnish a resinous binder.

20. A cellulosic sheet material, as claimed in claim 19, in which the resinous binder is an acrylic emulsion.

21. A cellulosic sheet material, as claimed in claim 19, in which the resinous binder is a styrene butadiene latex.

22. A cellulosic sheet material, as claimed in claim 19, in which a deposition aid for the resinous binder is added to the furnish.

* * * * *

UNITED STATES PATENT OFFICE
CERTIFICATE OF CORRECTION

Patent No. 3,819,470    Dated June 25, 1974

Inventor(s) Shaw/Wodka

It is certified that error appears in the above-identified patent and that said Letters Patent are hereby corrected as shown below:

Column 7, Example II, in the Table, "caliper" should be --tensile--; and "tensile" should be --caliper--.

Column 10, in the Table, "caliper" should be --tensile--; and "tensile" should be --caliper--.

Column 11, in the Table, the heading for column 3 should be --SWELLABILITY (cc/100g)--; column 4 should read --tensile (oz/in)-- and column 5 should read --caliper (.001 in)--.

Signed and sealed this 11th day of February 1975.

(SEAL)
Attest:

RUTH C. MASON
Attesting Officer

C. MARSHALL DANN
Commissioner of Patents
and Trademarks